United States Patent
(12) United States Patent
Forster et al.

(10) Patent No.: US 12,742,723 B2
(45) Date of Patent: Sep. 22, 2026

(54) OPTICAL ANALYSIS DEVICE FOR REMOTE ANALYSIS OF FLUID-BASED TESTS

(71) Applicant: United States Government As Represented By The Department Of Veterans Affairs, Washington, DC (US)

(72) Inventors: Sarah E. Forster, Pittsburgh, PA (US); Andrew A. Kivi, Minneapolis, MN (US)

(73) Assignee: United States Government as represented by the Department of Veterans Affairs, Washington, DC (US)

( * ) Notice: Subject to any disclaimer, the term of this patent is extended or adjusted under 35 U.S.C. 154(b) by 167 days.

(21) Appl. No.: 18/735,970

(22) Filed: Jun. 6, 2024

(65) Prior Publication Data

US 2024/0410819 A1 Dec. 12, 2024

Related U.S. Application Data

(60) Provisional application No. 63/506,729, filed on Jun. 7, 2023.

(51) Int. Cl.
*G01N 21/17* (2006.01)

(52) U.S. Cl.
CPC ..... *G01N 21/17* (2013.01); *G01N 2021/1776* (2013.01); *G01N 2201/0227* (2013.01); *G01N 2201/062* (2013.01); *G01N 2201/08* (2013.01)

(58) Field of Classification Search
CPC ........... G01N 2021/1776; G01N 21/17; G01N 21/8483; G01N 2201/0221; G01N 2201/0227; G01N 2201/062; G01N 2201/08
See application file for complete search history.

(56) References Cited

U.S. PATENT DOCUMENTS

| | | | | |
|---|---|---|---|---|
| 9,041,920 B2 * | 5/2015 | Mander | G01N 21/01 356/51 |
| 2016/0202190 A1 * | 7/2016 | Hein | G01N 21/78 422/69 |

* cited by examiner

*Primary Examiner* — Hina F Ayub
(74) *Attorney, Agent, or Firm* — Ballard Spahr LLP

(57) ABSTRACT

An optical analysis device for imaging a test sample with a camera including a housing base defining an interior volume, and a light chamber assembly disposed within the interior volume of the housing base. Optionally, the light chamber assembly includes a light tunnel defined by a continuous tube-shaped wall that extends from a first aperture to a second aperture: a light source is disposed both within the interior volume of the housing base and radially-outwardly of the tube-shaped wall of the light chamber. The camera is selectively positionable adjacent the first aperture of the light tunnel and the sample is selectively positionable within the interior volume of the housing base adjacent the second aperture of the light tunnel.

19 Claims, 12 Drawing Sheets

OPTICAL ANALYSIS DEVICE FOR REMOTE ANALYSIS OF FLUID-BASED TESTS

CROSS-REFERENCE TO RELATED APPLICATION

This application claims priority to and the benefit of the filing date of U.S. Provisional Patent Application No. 63/506,729, filed Jun. 7, 2023, the entirety of which is hereby incorporated by reference herein.

FIELD

This application is generally related to medical devices and procedures and, more particularly, to optical devices and methods of use thereof that facilitate the remote visual analysis of fluid-based test results.

BACKGROUND

The COVID-19 pandemic has energized interest in telehealth modalities, including remote administration and review of point-of-care testing devices. Point-of-care testing devices are used in a variety of contexts, including the treatment of substance use disorders and diagnosis of infectious diseases. Home-based implementation of existing point-of-care testing protocols via telehealth requires clear visualization of test results and can be significantly limited by suboptimal patient performance and lighting conditions. For example, many patients are unable to successfully transmit digital images due to technological and/or skill-based limitations. Patients attempting to share test results via telehealth video conferencing also frequently fail to successfully position testing devices for interpretation by the telehealth provider. Suboptimal lighting conditions in home-based settings may similarly limit correct interpretation of test results transmitted via digital image or synchronous telehealth session.

From the foregoing, one recognizes the need for devices for visually analyzing test results remotely from where the test is administered.

SUMMARY

Embodiments of the disclosed optical analysis claims are configured to allow an analysis of a test sample to be conducted from a remote location. Specifically, embodiments of the disclosed device allow images of test sample results to be transmitted to a remote location for viewing. An example embodiment of one such optical analysis device for imaging a test sample with a camera includes a housing base defining an interior volume, and a light chamber assembly disposed within the interior volume of the housing base. The light chamber assembly defines a first aperture in a first surface, a second aperture in a second surface, and a light tunnel defined by a continuous wall (e.g., a tube-shaped wall) that extends from the first aperture to the second aperture. A light source is disposed both within the interior volume of the housing base and radially-outwardly of the wall of the light chamber. When viewing a sample, the camera is selectively positionable adjacent the first aperture of the light tunnel and the sample is selectively positionable within the interior volume of the housing base adjacent the second aperture of the light tunnel.

In some embodiments, the present disclosure relates to a camera device including an adjustable enclosure having a camera portion, a lighting portion, and a test-receiving portion. The camera portion is mounted on an adjustable feature of the device enclosure. The lighting portion of the device is enclosed within a separate body within the main device enclosure. A test result is configured to enter the apparatus in the test-receiving portion and align with the camera portion and lighting portion. The camera device further includes a microcontroller. In some embodiments, the microcontroller can be configured to control the camera portion or the lighting portion.

The camera of the optical device is intended to complete two tasks. First, the camera of the optical device acts as a traditional webcam for telehealth visits. To accomplish this task, the camera is able to focus on a person sitting at a comfortable distance away from a computer screen. Second, the camera is also able to focus at a close range, to provide good visualization of the small test results. To accomplish this task, the device is designed in such a way that it has its own controlled and repeatable environment. A controlled environment is achieved by angling the camera inside of the device.

Another component of this design is the internal enclosure that is created when the lid is closed on the device. The device enclosure is practically void of light when the lid is closed and the test has been inserted into the device. Within the enclosure is also a self-contained light chamber. At least one LED light (e.g., a ring of LED lights) is mounted at the top of the internal light chamber and shines down in the direction of the drug test. A second component of the internal light chamber assembly is the light tunnel, which is designed to diffuse the light from the LEDs, creating a uniform glow to illuminate the test results. The orientation of the lights and the angle of the light tunnel can be optimized to maximum light permeation and minimize reflective glare. As well, the intensity of the light (i.e. brightness) of the light from the light source is also a factor when optimizing the light that reaches the test sample.

In some aspects, the color of the LEDs within the enclosure has also been optimized to increase the readability of the test results. For example, in some aspects, a wavelength between 500-550 nm can be desirable. In some embodiments, a wavelength of about 530 nm is used. This wavelength produces a green colored light. The color of the light can relate to the readability of the test results. For example, the color of the light emitted by the light source can be selected to optimize readability of the test results. Note also that embodiments of the device can include light sources that produce light wavelengths of various other spectrums. For example, some embodiments can include UV spectrum lighting. In still further aspects, the light source can include any range of wavelengths in the visible spectrum, wavelengths in the infrared spectrum, wavelengths in the UV spectrum, or combinations of wavelengths in two or more of infrared, visible, or UV spectra. For example, additional embodiments can include wavelengths from the light source within the range of 200 to 1000 nm, or within the range of 350 nm to 500 nm, or within the range of 500 to 600 nm, or within the range of 600 to 700 nm, or within the range of 700 to 1000 nm, or any combination of the foregoing ranges. It is contemplated that any wavelength of light needed for analysis as disclosed herein (for example, analysis of test strips) can be used.

In some embodiments of the device, at least one processor (e.g., a microcontroller or microprocessor) is used to control the LED lights that illuminate inside the box. A custom computer code (a Python code, etc.) can be uploaded to the microcontroller to control the color and brightness of the LEDs.

In other embodiments of the device, at least one processor (e.g., a microcontroller or microprocessor) can also be used to control the camera of the device.

In other embodiments of the device, the at least one processor (e.g., a microcontroller or microprocessor) and the camera can be used to interpret the test results using computer vision techniques. For example, the at least one processor can receive data from the camera and determine, based on the data received from the camera, an interpretation of the test results. The interpretation can include, for example, a positive result, and negative result, or an inconclusive result.

In other embodiments of the device, an object detection model can be trained to interpret the test results. A trained object detection model can run on the at least one processor (e.g., microcontroller or microprocessor) within the device.

In other embodiments of the device where at least one processor (e.g., microprocessor) and an object detection model are used, the device can provide feedback to the user (patient). Feedback such as visual, audio, or haptics could be used to alert users to their test results.

Additional advantages of the disclosed devices, systems, and methods will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1A:
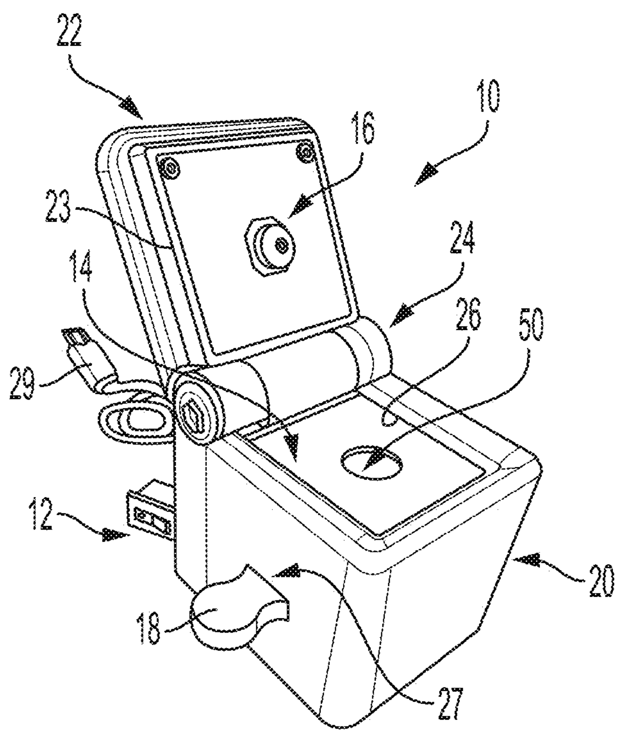
FIGS. 1A and 1B are isometric views of an optical analysis device in accordance with an embodiment of the present disclosure.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

All technical and scientific terms used herein have the same meaning as commonly understood to one of ordinary skill in the art to which this invention belongs unless clearly indicated otherwise.

As used herein, the terms “optional” or “optionally” mean that the subsequently described event or circumstance may or may not occur, and that the description includes instances where said event or circumstance occurs and instances where it does not.

As used herein, the term “at least one of” is intended to be synonymous with “one or more of.” For example, “at least one of A, B and C” explicitly includes only A, only B, only C, and combinations of each.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint. Optionally, in some aspects, when values are approximated by use of the antecedents “about,” “substantially,” or “generally,” it is contemplated that values within up to 15%, up to 10%, up to 5%, or up to 1% (above or below) of the particularly stated value can be included within the scope of those aspects. In other aspects, when angular values are approximated by use of the antecedents “about,” “substantially,” or “generally,” it is contemplated that angular values within up to 15 degrees, up to 10 degrees, up to 5 degrees, or up to one degree (above or below) of the particularly stated angular value can be included within the scope of those aspects.

The word "or" as used herein means any one member of a particular list and, unless context dictates otherwise, in alternative aspects, can also include any combination of members of that list.

In the following description and claims, wherever the word "comprise" or "include" is used, it is understood that the words "comprise" and "include" can optionally be replaced with the words "consists essentially of" or "consists of" to form another embodiment.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

As used herein, "adjacent" can refer to within 10 mm, within 9 mm, within 8 mm, within 7 mm, within 6 mm, within 5 mm, within 4 mm, within 3 mm, within 2 mm, or within 1 mm. In further aspects, two elements that are "adjacent" can optionally be in direct contact with each other. It is contemplated that a sufficient proximity between two "adjacent" elements can be determined by one skilled in the art to serve the purpose as understood based on the present disclosure. Accordingly, a camera being positioned "adjacent" a first end of a light tunnel can be sufficiently close to capture a test sample with suitable image quality for interpretation of the test sample.

Figure 1B:
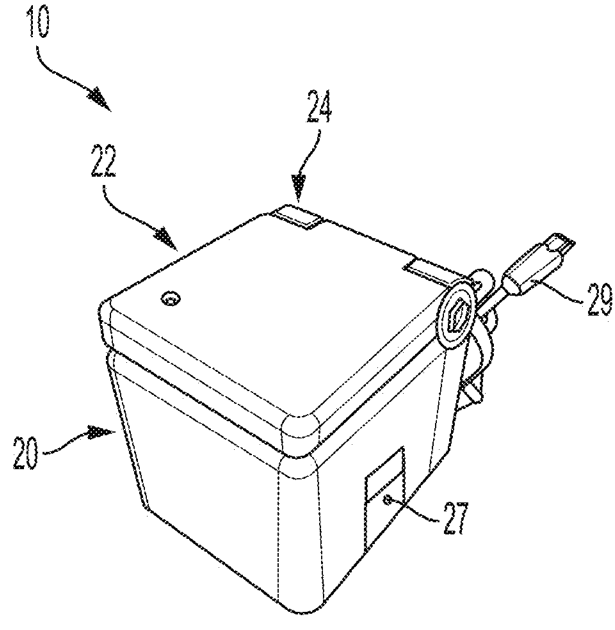
Figure 2:
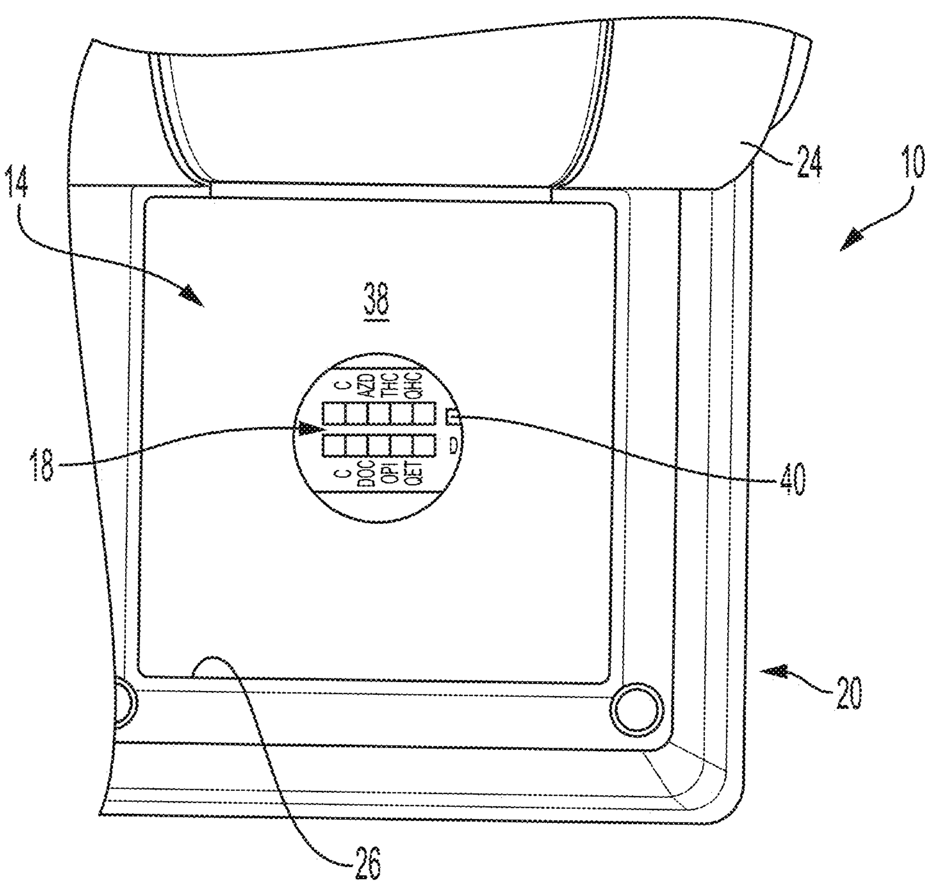
FIG. 2 is a partial top plan view of the optical analysis device shown in FIGS. 1A and 1B.

Referring now to FIGS. 1A and 1B, an embodiment of an optical analysis device 10 in accordance with the present invention can include a housing assembly 12, a light tunnel assembly 14 disposed therein, and a camera 16 that is configured to make visual images of a test result sample 18 (FIG. 2). In the embodiment shown, the housing assembly 12 includes both a housing base 20 and a housing lid 22 that is pivotably secured to the housing base 20 by a hinge 24. The housing base 20 defines an interior compartment 26 that is configured to receive both the light tunnel assembly 14 and the test sample 18 therein. In some aspects, the test sample is slidably received in a sample recess 27 through an aperture formed in the side of the housing base 20. In some embodiments, the interior compartment 26 of the housing base 20 may also be configured to receive an internal power source, such as a battery (60, FIG. 6), and at least one processing unit (e.g., a microcontroller/microprocessor) therein. In the present embodiment, a USB cord 29 is used to connect the optical analysis device 10 to an external computer. However, it is contemplated that the optical analysis device can be communicatively coupled to an external computing device using any wireless or wired connection as is known in the art.

Figure 3:
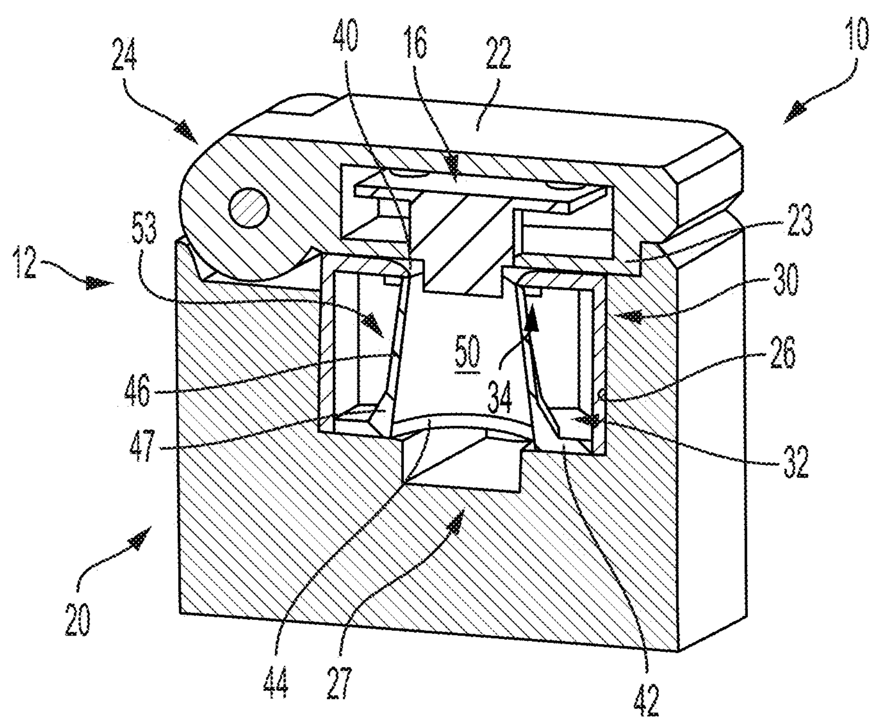
FIG. 3 is a cross-sectional view of the optical analysis device shown in FIGS. 1A and 1B.
Figure 4:
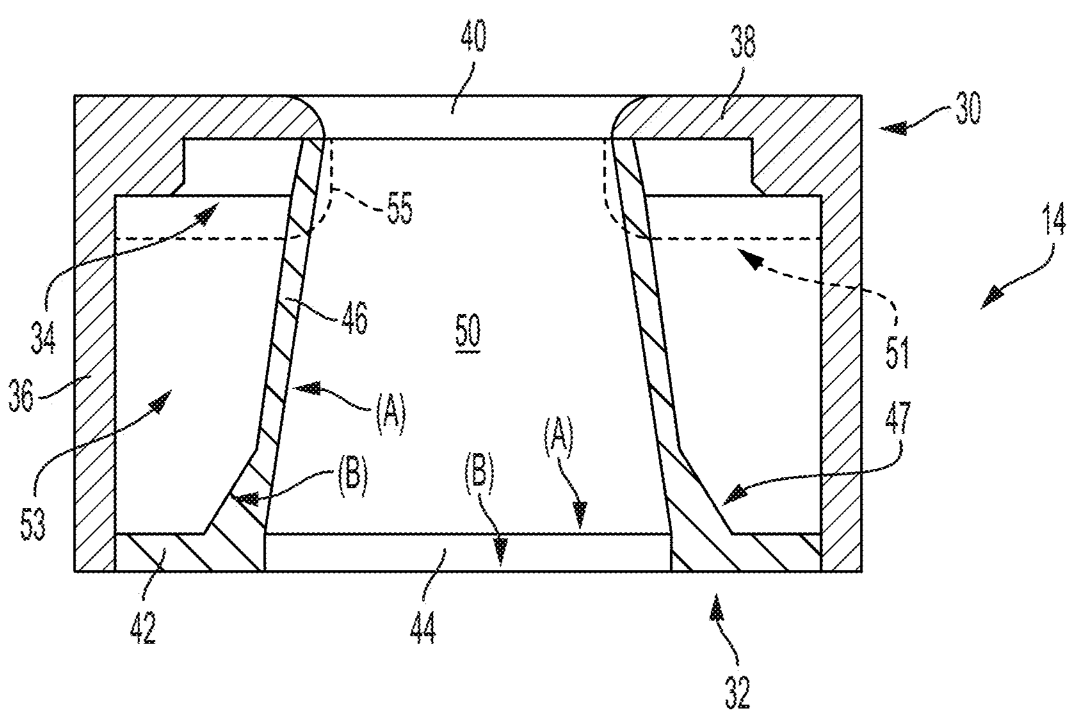
FIG. 4 is a cross-sectional view of the light chamber assembly of the optical analysis device shown in FIGS. 1A and 1B.

Referring additionally to FIGS. 3, 4, 7A, and 7B, the light tunnel assembly 14 may include a body portion 30, a tunnel portion 32, and a light source 34. As shown, the body portion 30 includes a side wall 36 that substantially conforms to the interior compartment 26 of the housing base 20 and a top wall 38 that defines an inlet aperture therein. The tunnel portion 32 of the light tunnel assembly 14 includes a bottom wall 42 defining an outlet aperture and an inner wall 46 (optionally, a continuous inner wall) that defines a light tunnel 50. The light tunnel 50 has a first end 40 and a second end 44. In some aspects, the inner wall 46 defining the light tunnel 50 is frustoconically shaped, with the outlet aperture having a greater diameter than the inlet aperture. As best seen in FIG. 4, the wall 46 of the light tunnel 50 can include a thickened wall portion 47 that helps further diffuse the light directly adjacent the outlet aperture and, therefore, the test sample 18. Note, however, in alternative aspects, the inner wall 46 can be cylindrically shaped, rectangularly shaped, oval, etc. In other aspects, it is contemplated that the inner wall 46 can have a variable profile, such as, for example, a tapered portion that joins with a cylindrical portion.

As shown, the body portion 30 and the light tunnel portion 32 of the light tunnel assembly 14 define an inner volume 53 in which the light source 34 is disposed. In the present embodiment, the light source 34 is at least one light-emitting diode (LED) (optionally, a plurality of LEDs) 52. In this embodiment the LED(s) can be formed into a ring around the upper portion of the light tunnel 50. The ring configuration helps to ensure even light distribution is provided when imaging a test sample. Additionally, the body portion 30 and light tunnel portion 32 of the light tunnel assembly 14 are formed of translucent material (optionally, transparent material) to diffuse the light from the light source 34, thereby creating a uniform glow to illuminate the test sample results 18 (FIG. 2). The orientation of the light source 34 within the light tunnel assembly 14 and the angle of the wall of the light tunnel 50 are also optimized for maximum light permeation and minimum glare when imaging. As noted above, although placing the light source 34 adjacent the top wall 38 of the body portion 30 is preferable, the light source 34 may be placed at any position that is radially-outward of the light tunnel's wall 46. As shown, the optimal wall angle for the noted light source 34 placement has been determined to be an internal angle (A) of approximately 82° which meets with the thickened wall portion 47 that has an angle of approximately 60°. The internal angle (A) is preferably between 70° to 90°.

In alternate embodiments, the light tunnel assembly may be excluded. For example, referring to FIG. 4, in an alternate embodiment of the optical analysis device 10, the light tunnel portion 32 may be replaced with another element that is used to diffuse light, such as a translucent or transparent panel 51 (shown in phantom lines). As shown, the translucent or transparent panel 51 includes a central aperture 55 to allow camera access and overlies the light source 34 at the top wall of the body portion 30. As such, although the light tunnel is excluded, the camera 16 may still focus on the test sample 18 and the light reaching the sample is diffused through the panel 51. More generally, it is contemplated that a light diffusion assembly including one or more translucent or transparent portions for diffusing light toward the sample can be provided in place of the light tunnel assembly disclosed herein. For example, in various aspects, the light diffusion assembly can at least partially surround and/or support the light source 34 such that the translucent or transparent portions of the light diffusion assembly are generally positioned between the light source 34 and the sample.

As best seen in FIGS. 1A and 3, the camera 16 of the optical analysis device 10 is mounted to the underside of the housing lid 22. As such, the camera 16 is pivotable between a first position (FIG. 1A) in which the camera 16 is external to the housing body 20 and a second position (FIG. 3) in which the camera 16 is adjacent the first end 40 of the light tunnel 50. The camera 16 is capable of focusing on a person, such as during an online meeting, when in the position shown in FIG. 1A, as well as focusing on a sample 18 disposed within the optical analysis device 10 when in the position shown in FIG. 3. As such, the camera 16 functions as both a traditional webcam for telehealth visits, and an analysis device capable of imaging test results at very short range.

Optionally, but preferably, the LEDs 52 selected as the light source 34 produce green colored light, which has been found to optimize the readability of a majority of sample test results. Specifically, in preferred embodiments, the light can be provided at a wavelength of about 500 to about 550 nm, about 510 to about 540 nm, or most preferably, about 530 nm. Note, however, light sources producing varying wavelength light, such as, for example and without limitation, in the UV spectrum, may also be used. Additionally, to help ensure the interior compartment 26 of the housing 12 is not exposed to outside light when the housing lid 22 is closed (FIG. 3), the housing lid 22 includes a projection 23 on which the camera 16 is mounted, wherein the projection 23 extends downwardly into the internal compartment 26 of the housing body 20 to form a light seal that prevents or substantially prevents entry of outside light.

Figure 5A:
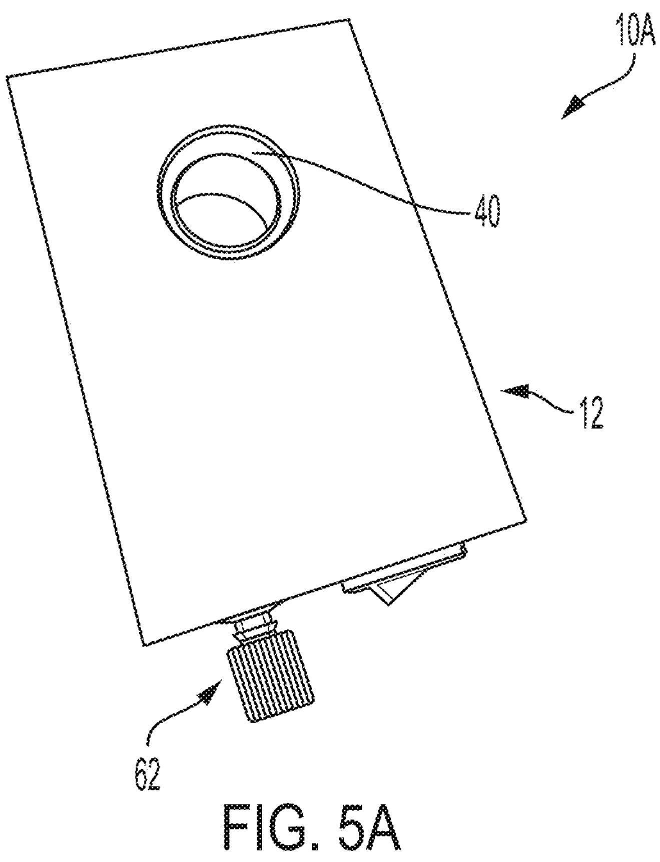
FIGS. 5A and 5B are isometric views of an optical analysis device in accordance with an alternate embodiment of the invention.
Figure 5B:
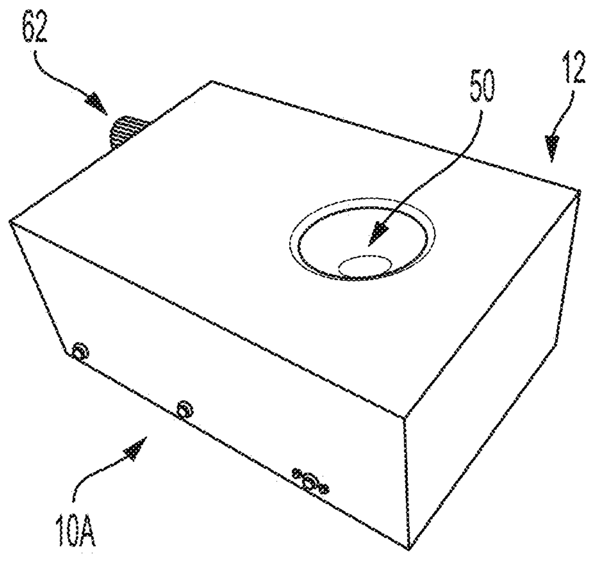
Figure 6:
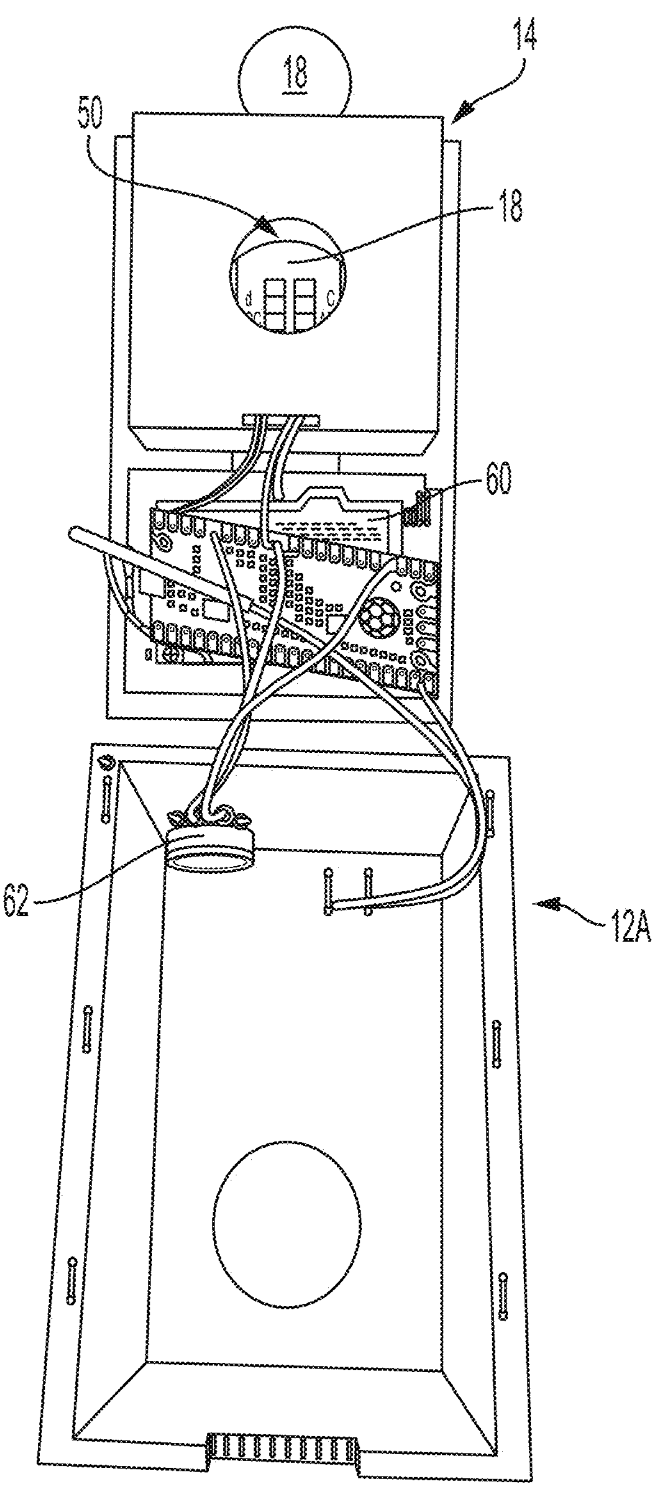
FIG. 6 is a top view of the optical analysis device shown in FIGS. 5A and 5B, with the top removed to reveal internal components.
Figure 7A:
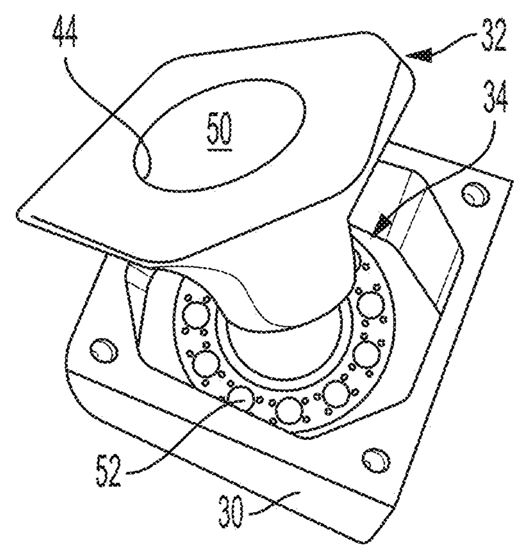
FIGS. 7A and 7B are views of a light tunnel assembly of the optical analysis device shown in FIGS. 5A and 5B.
Figure 7B:
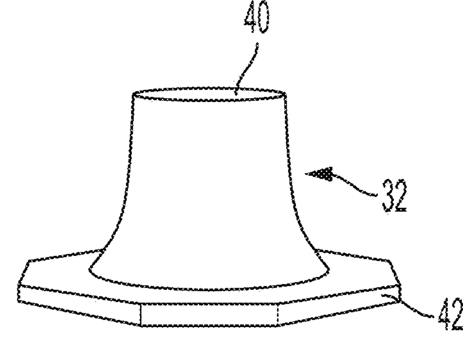
Figure 8:
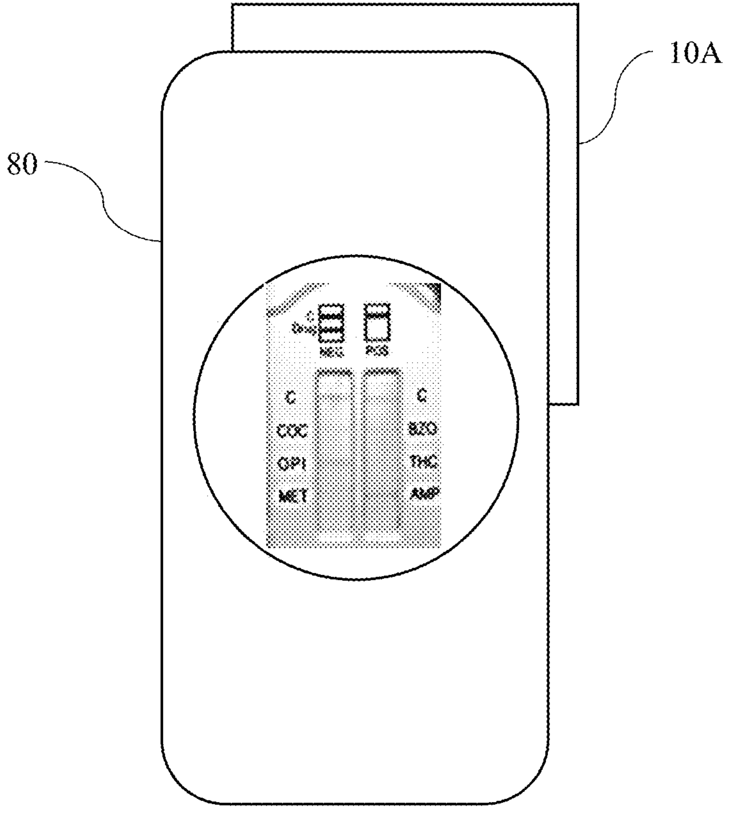
FIG. 8 is an isometric view of the optical analysis device shown in FIGS. 5A and 5B in use with a cell phone camera.
Figure 9:
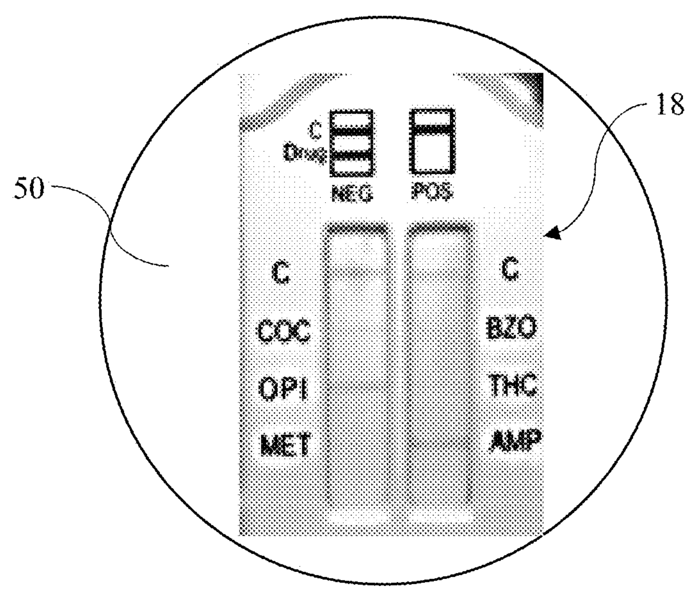
FIG. 9 is a close-up view of an image of a test sample result as viewed by the optical analysis device shown in FIG. 8.
Figure 10:
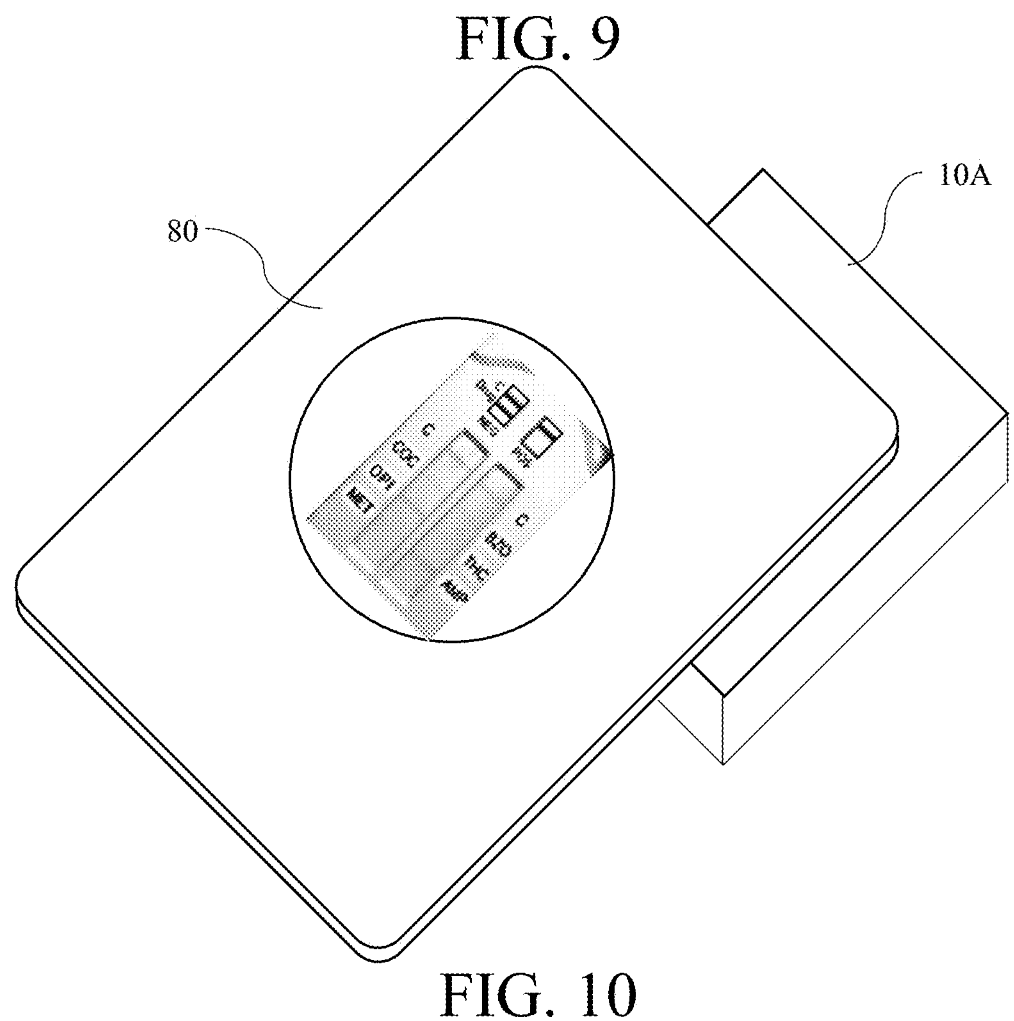
FIG. 10 is an isometric view of the optical analysis device shown in FIGS. 5A and 5B in use with a tablet camera.

Referring now to FIGS. 5A, 5B, and 6, an alternate embodiment of an optical analysis device 10A is shown. The optical analysis device 10A differs primarily from the first discussed embodiment in that a camera on a cell phone 80 (e.g., a smartphone, shown in FIG. 8) or a tablet 90 (FIG. 10) is used to image the test sample result 18, rather than a dedicated camera 16 as in the first embodiment. As such, the housing 12A of the optical analysis device 10A need not include a lid portion so that the camera of either the cell phone 80 or tablet 90 may be positioned adjacent the first end 40 of the light tunnel 50. Additionally, an internal power source 60, or battery, is provided as well as a potentiometer 62 to control the brightness of the light source 34. Optionally, a clamp can be provided to secure the cell phone 80 or tablet 90 to the analysis device 10A. In further aspects, a clamp can be provided to secure the analysis device 10A to a table to prevent the analysis device 10A from moving relative to the table.

Figure 11:
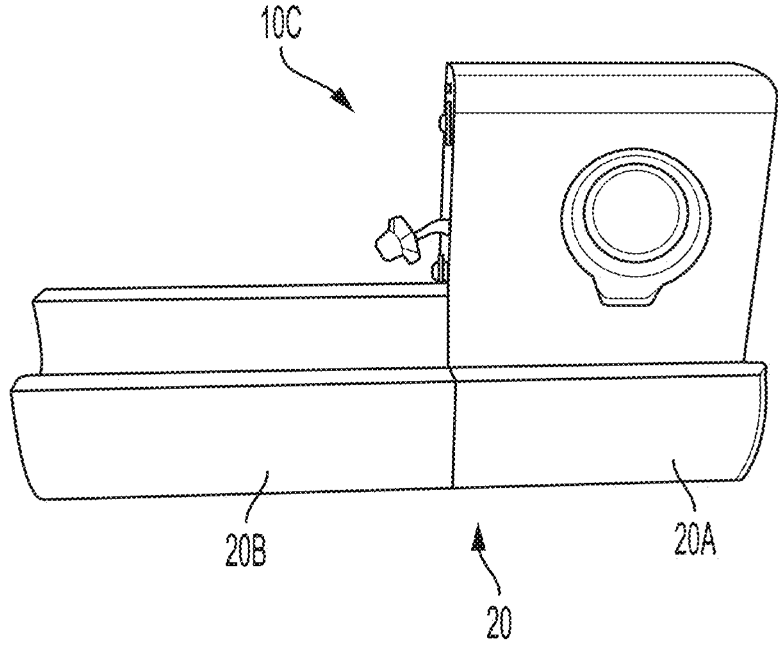
FIG. 11 is an isometric view of an optical analysis device in accordance with an alternate embodiment of the invention.
Figure 12A:
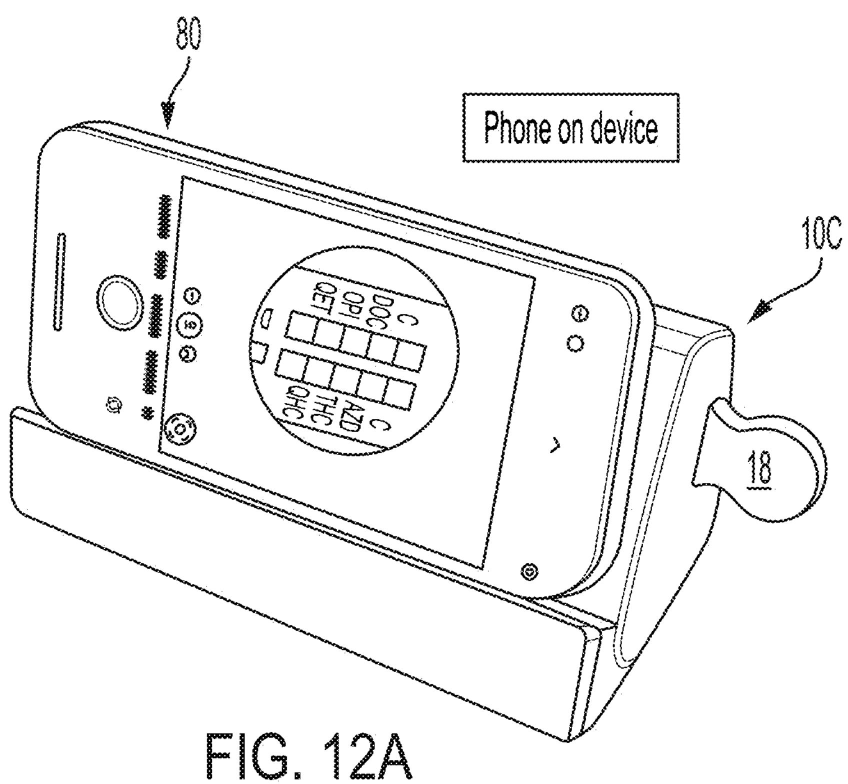
FIGS. 12A and 12B are isometric views of the optical analysis device shown in FIG. 11 in use with a cell phone camera and a tablet camera, respectively.
Figure 12B:
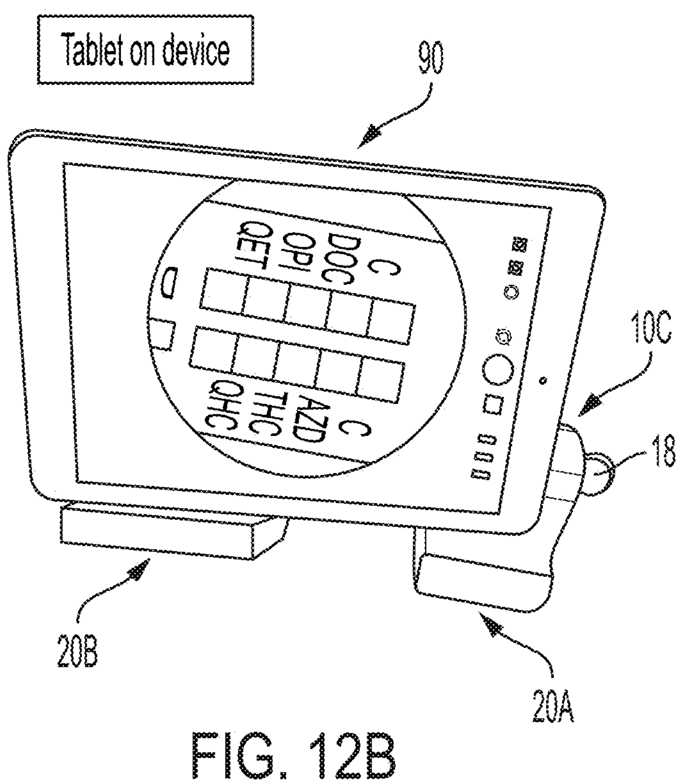
Figure 13A:
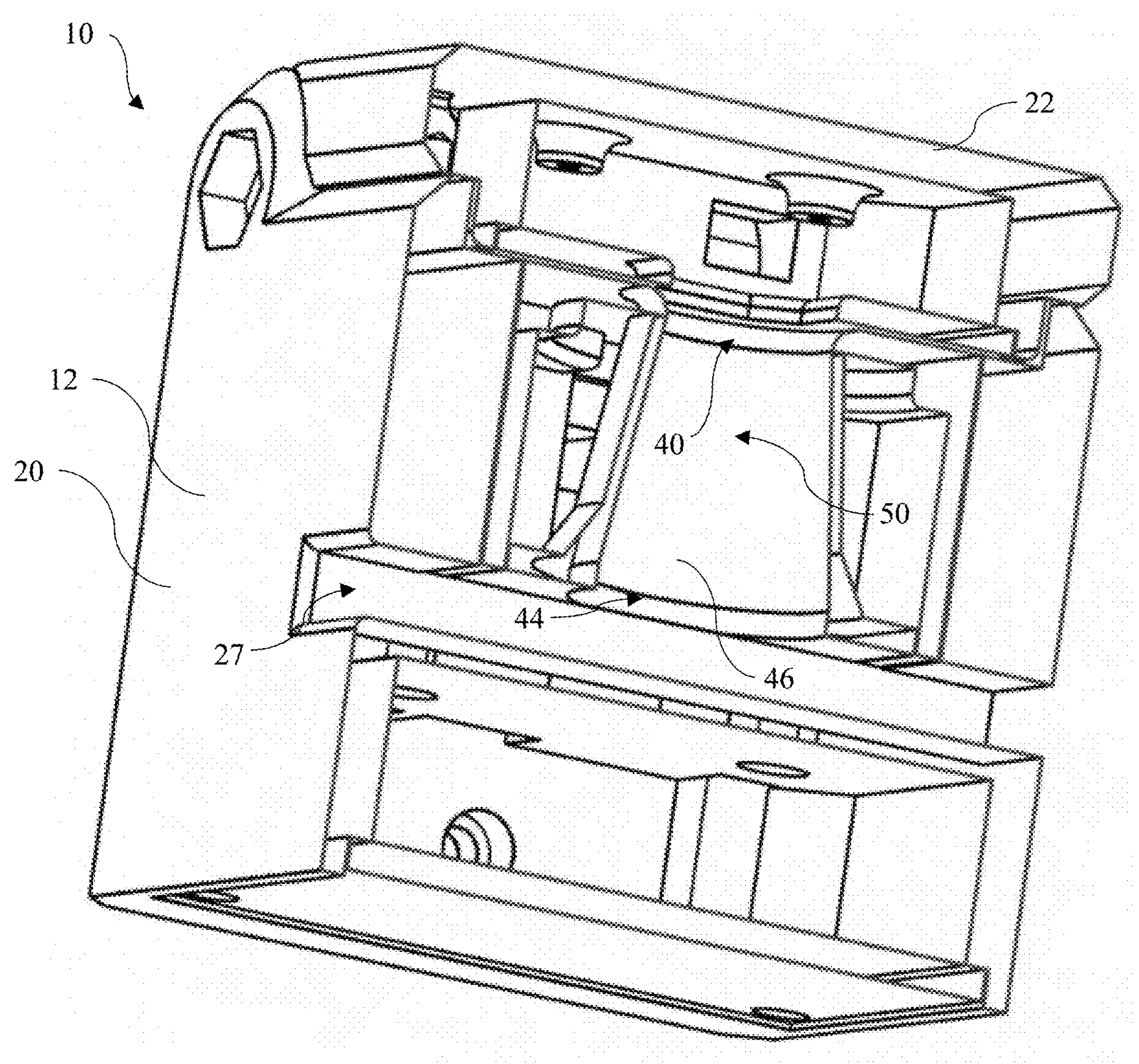
FIGS. 13A and 13B are sectional views of an exemplary optical analysis device taken in respective vertical planes that are parallel to each other.
Figure 13B:
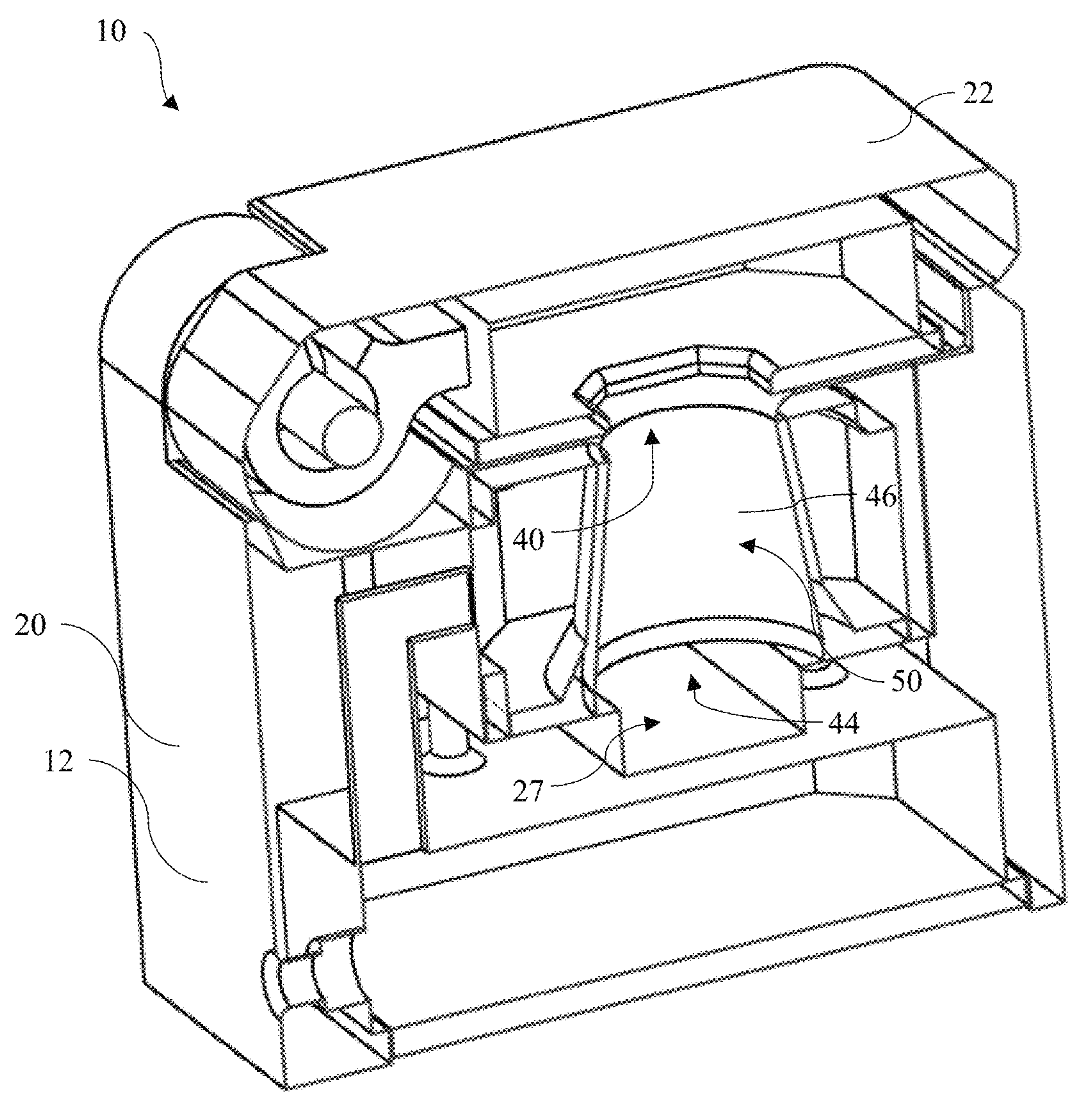

Yet another embodiment of an optical analysis device 10C is shown in FIGS. 11, 12A, and 12B. As shown, the housing body 20 of the optical analysis device 10C includes a support structure (e.g., a cradle) for receiving and/or supporting the cell phone 80 or tablet 90, with the support structure being oriented so that the user need not hold onto the cell phone 80 or tablet 90 during imaging. Additionally, the housing body 20 may be divided into two parts 20A, 20B to accommodate differently sized cell phones and tablets.

An example use of the optical analysis device 10, as shown in FIGS. 1A and 1B, during a telehealth visit is now presented. In use, a patient ensures the optical analysis device 10 has connectivity with a computer by way of the USB cord 29. The patient then adjusts the position of the lid portion 22 of the device so that the patient is in the field of view of the camera 16 (FIG. 1A). After establishing connectivity with the clinician conducting the telehealth visit, the patient may take a test sample as instructed by the clinician. The test sample 18 is then slid into position within the sample recess 27 of the optical test device 10. After the desired amount of time has passed to enable reading the test sample results, the patient closes the lid portion 22 of the optical analysis device 10 so the camera is positioned as shown in FIG. 1B. Once the clinician has reviewed the test sample results 18, the patient may once again open the lid portion 18 of the optical analysis device 10 so that the clinician may see the patient on the computer screen in order to continue the telehealth visit.

In use, the disclosed devices, systems, and methods can provide the positioning, stabilization, and illumination that is necessary for interpretation of test results via telehealth video technology. Therefore, it is contemplated that the disclosed devices, systems, and methods have great promise to improve care for individuals with substance use disorders, who may otherwise require in-person toxicology testing multiple times per week in order to participate in medication-assisted treatment for opioid use disorder or reward-based interventions such as Contingency Management. Other applications of the disclosed devices, systems, and methods include, for example and without limitation, telehealth-based screening for infectious diseases and cancer. In use, it is contemplated that the disclosed devices, systems, and methods can allow for live interpretation of test results by the human eye and may also facilitate "smart detection" of results via machine learning (e.g., machine vision) algorithms as these technologies emerge.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An optical analysis device for imaging a test sample with a camera, comprising.

a housing base defining an interior volume configured to receive the test sample;

at least one wall defining a light tunnel disposed within the interior volume of the housing base, the light tunnel having a first end and a second end; and a light source disposed both within the interior volume of the housing base and radially-outwardly of the at least one wall that defines the light tunnel, wherein the camera is selectively positionable adjacent the first end of the light tunnel, and wherein the interior volume of the housing base permits selective positioning of the sample adjacent the second end of the light tunnel.

Aspect 2: The optical analysis device of aspect 1, wherein the at least one wall that defines the light tunnel comprises a translucent material.

Aspect 3: The optical analysis device of aspect 2, wherein the at least one wall that defines the light tunnel is tube-shaped, and wherein the light source further comprises a plurality of light emitting diodes arranged in a ring around the tube-shaped wall of the light tunnel.

Aspect 4: The optical analysis device of aspect 3, wherein the light source is disposed adjacent the first end opposite the second end.

Aspect 5: The optical analysis device of any one of aspects 2-4, further comprising a sample aperture defined in a side wall of the housing base that is in communication with the interior volume so that the test sample is slidably positionable adjacent the second end of the light tunnel.

Aspect 6: The optical analysis device of any one of the preceding aspects, further comprising:

a power source for providing power to the light source; and a potentiometer for adjusting a level of current to the light source.

Aspect 7: The optical analysis device of any one of aspects 2-6, further comprising:

a housing lid that is pivotably secured to the housing base; and the camera, wherein the camera is secured to the housing lid, and the housing lid is pivotable between a first position in which the camera is adjacent the first end of the light tunnel and a second position in which the camera is remote from the first end of the light tunnel.

Aspect 8: The optical analysis device of aspect 7, wherein the housing lid includes a projection to which the camera is secured, wherein the projection extends into the interior volume of the housing base when the housing lid is in the first position.

Aspect 9: The optical analysis device of any one of aspects 2-6, wherein the light source emits light in the green light spectrum only.

Aspect 10: The optical analysis device of aspect 9, wherein the green light emitted from the light source has a wavelength between 500-550 nm.

Aspect 11: The optical analysis device of any one of aspects 2-6, wherein the at least one wall that defines the light tunnel is frustoconically shaped.

Aspect 12: The optical analysis device of any one of aspects 1-6 or 9-11, further comprising a smartphone or tablet, wherein the smartphone or tablet comprises the camera.

Aspect 13: An optical analysis device for imaging a test sample, comprising;

a camera;

a housing base defining an interior volume and configured to receive the test sample;

a bore defining a light tunnel within the interior volume of the housing base; and a light source disposed both within the interior volume of the housing base and radially-outwardly of the light tunnel;

wherein the camera is selectively positionable adjacent a first end of the light tunnel, and wherein the interior volume of the housing base permits selective positioning of the sample adjacent a second end of the light tunnel.

Aspect 14: The optical analysis device of aspect 13, wherein the light tunnel comprises a translucent material.

Aspect 15: The optical analysis device of aspect 14, wherein the continuous bore of the light tunnel is defined by a wall, and wherein the light source further comprises a plurality of light emitting diodes arranged in a ring around the wall of the light tunnel.

Aspect 16: The optical analysis device of aspect 15, wherein the light source is disposed adjacent the first end opposite the second end of the light tunnel.

Aspect 17: The optical analysis device of aspect 14, further comprising a sample aperture defined in a side wall of the housing base that is in communication with the interior volume so that the test sample is slidably positionable adjacent the second end of the light tunnel.

Aspect 18: The optical analysis device of any one of aspects 13-17, wherein the continuous bore that defines the light tunnel is frustoconically shaped.

Aspect 19: The optical analysis device of aspect 14, further comprising a housing lid that is pivotably secured to the housing base, wherein the camera is secured to the housing lid, and the housing lid is pivotable between a first position in which the camera is adjacent the first end of the light tunnel and a second position in which the camera is remote from the first end of the light tunnel.

Aspect 20: The optical analysis device of any one of aspects 14-19, wherein the light source emits light in the green light spectrum only.

Aspect 21: The optical analysis device of aspect 20, wherein the green light emitted from the light source has a wavelength between 500-550 nm.

Aspect 22: The optical analysis device of any one of aspects 14-21, wherein the light source emits light in the UV spectrum only.

Aspect 23: The optical analysis device of claim 14, wherein the light source emits light having a wavelength in the visible and/or infrared spectrum.

Aspect 24: An optical analysis device for imaging a test sample, the optical analysis device comprising:

a camera;

a housing base defining an interior volume and configured to receive the test sample;

a light source disposed within the interior volume of the housing base; and a light chamber disposed within the interior volume of the housing base, the light chamber defining a camera aperture;

wherein the camera is selectively positionable adjacent the camera aperture of the light chamber, and wherein the light chamber is disposed between the light source and the test sample.

Aspect 25: The optical analysis device of aspect 24, wherein the light chamber comprises at least one transparent or translucent panel.

Aspect 26: The optical analysis device of aspect 24, wherein the light chamber comprises at least one wall that defines a light tunnel.

Aspect 27: An optical analysis device for imaging a test sample, comprising;

a housing base defining an interior volume and configured to receive the test sample;

a light source disposed within the interior volume of the housing base; and a light chamber disposed within the interior volume of the housing base, the light chamber defining a camera aperture and a second end;

a sample aperture defined in a side wall of the housing base that is in communication with the interior volume so that the test sample is slidably positionable adjacent the second end of the light chamber.

Aspect 28: The optical analysis device of aspect 27, wherein the light chamber is disposed between the light source and the test sample.

Although the foregoing invention has been described in some detail by way of illustration and example for purposes of clarity of understanding, certain changes and modifications may be practiced within the scope of the appended claims.

What is claimed is:

1. An optical analysis device for imaging a test sample with a camera, comprising:

a housing base defining an interior volume configured to receive the test sample;

at least one wall defining a light tunnel disposed within the interior volume of the housing base, the light tunnel having a first end and a second end; and a light source disposed both within the interior volume of the housing base and radially-outwardly of the at least one wall that defines the light tunnel, wherein the camera is selectively positionable adjacent the first end of the light tunnel, and wherein the interior volume of the housing base permits selective positioning of the sample adjacent the second end of the light tunnel.

2. The optical analysis device of claim 1, wherein the at least one wall that defines the light tunnel comprises a translucent material.

3. The optical analysis device of claim 2, wherein the at least one wall that defines the light tunnel is tube-shaped, and wherein the light source further comprises a plurality of light emitting diodes arranged in a ring around the tube-shaped wall of the light tunnel.

4. The optical analysis device of claim 3, wherein the light source is disposed adjacent the first end of the light tunnel, opposite the second end.

5. The optical analysis device of claim 2, further comprising a sample aperture defined in a side wall of the housing base that is in communication with the interior volume so that the test sample is slidably positionable adjacent the second end of the light tunnel.

6. The optical analysis device of claim 2, further comprising:

a housing lid that is pivotably secured to the housing base; and the camera, wherein the camera is secured to the housing lid, and the housing lid is pivotable between a first position in which the camera is adjacent the first end of the light tunnel and a second position in which the camera is remote from the first end of the light tunnel.

7. The optical analysis device of claim 2, wherein the light source emits light only within a wavelength between 500 nm and 550 nm.

8. The optical analysis device of claim 2, wherein the at least one wall that defines the light tunnel is frustoconically shaped.

9. The optical analysis device of claim 1, further comprising a smartphone or tablet, wherein the smartphone or tablet comprises the camera.

10. An optical analysis device for imaging a test sample, comprising:

a camera;

a housing base defining an interior volume and configured to receive the test sample;

a bore defining a light tunnel within the interior volume of the housing base; and a light source disposed both within the interior volume of the housing base and radially-outwardly of the light tunnel;

wherein the camera is selectively positionable adjacent a first end of the light tunnel, and wherein the interior volume of the housing base permits selective positioning of the sample adjacent a second end of the light tunnel.

11. The optical analysis device of claim 10, wherein the light tunnel comprises a translucent material, wherein the continuous bore of the light tunnel is defined by a wall, and wherein the light source further comprises a plurality of light emitting diodes arranged in a ring around the wall of the light tunnel.

12. The optical analysis device of claim 11, wherein the light source is disposed adjacent the first end opposite the second end of the light tunnel.

13. The optical analysis device of claim 10, further comprising a sample aperture defined in a side wall of the housing base that is in communication with the interior volume so that the test sample is slidably positionable adjacent the second end of the light tunnel.

14. The optical analysis device of claim 10, wherein the light source emits light in the green light spectrum only.

15. The optical analysis device of claim 14, wherein the green light emitted from the light source has a wavelength between 500 nm and 550 nm.

16. The optical analysis device of claim 10, wherein the light source emits light in the UV spectrum only.

17. The optical analysis device of claim 10, wherein the light source emits light having a wavelength in the visible and/or infrared spectrum.

18. An optical analysis device for imaging a test sample, the optical analysis device comprising:

a camera;

a housing base defining an interior volume and configured to receive the test sample;

a light source disposed within the interior volume of the housing base; and a light chamber disposed within the interior volume of the housing base, the light chamber defining a camera aperture, wherein the light chamber comprises at least one wall that defines a light tunnel;

wherein the camera is selectively positionable adjacent the camera aperture of the light chamber, wherein the light chamber is disposed between the light source and the test sample, and wherein the light source is positioned radially outwardly of the light tunnel.

19. The optical analysis device of claim 18, wherein the light chamber comprises at least one transparent or translucent panel.

* * * * *